No. 868,099. PATENTED OCT. 15, 1907.
J. T. KOEN.
PUSH CART.
APPLICATION FILED APR. 29, 1907.
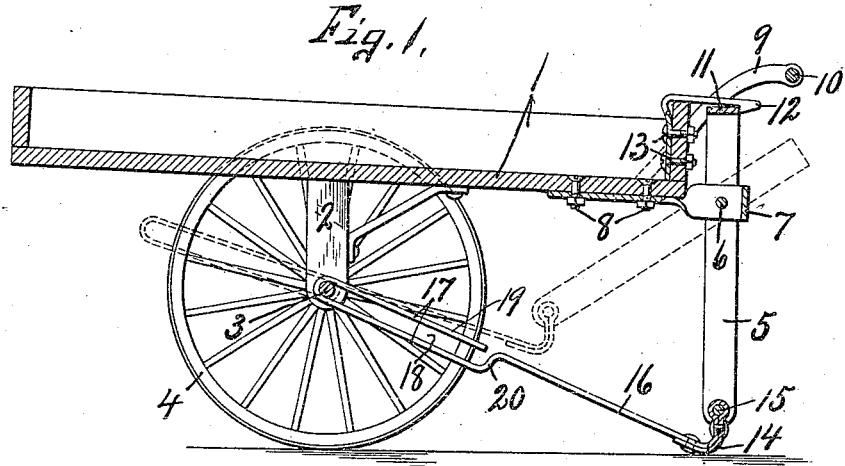
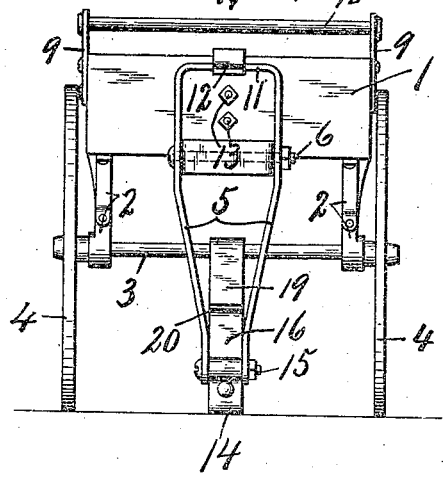
Witnesses.
A. C. Thomas.
H. E. Chase.
Inventor.
J. T. Koen
By.
Howard P. Denison
Attorney.

UNITED STATES PATENT OFFICE.

JOSEPH T. KOEN, OF ONEIDA, NEW YORK.

PUSH-CART.

No. 868,099.  Specification of Letters Patent.  Patented Oct. 15, 1907.

Application filed April 29, 1907. Serial No. 370,921.

*To all whom it may concern:*

Be it known that I, JOSEPH T. KOEN, of Oneida, in the county of Madison, in the State of New York, have invented new and useful Improvements in Push-Carts, of which the following, taken in connection with the accompanying drawings, is a full, clear, and exact description.

This invention relates to certain improvements in push carts of the two-wheel type in which the box or body is centrally balanced upon the axle. The rear end of a cart of this class is usually equipped with a rigid pendent leg adapted to rest upon the ground to hold the box or body in a substantially horizontal position when the vehicle is at rest, the excess of load being usually at the rear of the axle, but in wheeling the cart down steep inclines and off from a curb and also down steps, as is frequently necessary, the rigid pendent leg is in the way and prevents the box or body from being maintained in a horizontal position, that is, the lower end of the leg strikes the step or elevation at the rear of the wheels and throws the rear end of the body upward so that it is very difficult to wheel the cart down a steep incline or steps.

My object is to provide the cart with a movable or swinging leg adapted to be held rigidly in place when wheeling the cart along comparatively level pavement and at the same time such leg may be rocked or tilted forwardly and upwardly toward the body of the vehicle a sufficient distance to clear the ground, curb or steps so that the cart may be readily wheeled down such incline and the body or box mounted in a horizontal position without striking the leg against the inclined or step surface over which the wheels have traveled.

Other objects and uses relating to the specific construction of the leg and its connection with the axle will be brought out in the following description.

In the drawings—Figure 1 is a longitudinal sectional view of a cart equipped with my invention. Fig. 2 is a rear end view of the device seen in Fig. 1.

This cart comprises essentially a box or body —1— having pendent brackets —2— between its front and rear ends carrying a shaft —3— upon which is journaled suitable wheels —4—, the shaft being located in a plane some distance below and slightly in front of the longitudinal center of the box so that the latter when loaded may be normally balanced but with the excessive weight at the rear of the axle to enable the operator to better control the balancing and wheeling of a load and at the same time to throw the excessive weight of the load upon a pendent leg as —5— which is mounted upon the rear end of the body —1—. This leg —5— preferably consists of an inverted U-shape bar pivoted at —6— to a bracket —7— which is secured by suitable bolts —8— to the under side of the body —1— at the rear end of said body. This bracket —7— is also U-shape and its opposite arms are spaced some distance apart and secured as described to the under side of the body, the rear ends of the side bars being united by a cross bar some distance at the rear of the rear end of the body, which cross bar may serve as a handle by which the cart may be pushed or wheeled along the pavement, although I prefer to provide the body with additional handle straps —9— secured to the sides of the body and connected by a handle —10— as seen in the drawings. The opposite arms of the U-shape leg —5— are spaced apart and pivoted to the side arms of the bracket —7— and extend some distance above said bracket at the rear of the body —1— where they are united at the top by a cross bar —11— forming a part of the leg —5—.

A spring catch —12— is secured by suitable fastening means as bolts —13— to the rear end of the body —1— and extends rearwardly over the top of the rear end to engage the arm —11— and hold the leg —5— in its vertical or operative position. It is now clear that the catch —12— engages the upper end of the leg above its pivot by lifting up on the free end of the catch, the leg is released and may be tilted or rocked upon its pivot —6— to throw its lower end from the ground toward the under side of the body —1— and toward the axle —3— clear from the ground.

The lower portion of the leg —5— is of sufficient length to engage the ground and hold the body —1— in a substantially horizontal position when the vehicle is at rest or moved along comparatively level pavements but is in this instance, provided with a wearing shoe, —14— which is pivoted at —15— to the lower end of the leg and forms a part of the strip —16— extending rearwardly from the shoe —14— and interlocked with the axle —3— by means of an open hook or loop —17—.

This loop —17— is formed by bending the rear end of the strap —16— back upon itself forming an intervening elongated slot —18— and a spring tongue —19—, the slot —18— being of sufficient length to permit the lower end of the leg —5— to be rocked rearwardly and upwardly toward the bottom of the body —1— and toward the axle —3— a sufficient distance to permit the vehicle to be wheeled down steep inclines or steps without engaging the shoe —14— or leg —5— with the inclined surface or steps over which the wheels have traveled.

The strap —16— is offset at the rear end of the slot —18— forming a stop shoulder —20— to engage the axle —3— and limit the rearward movement of the leg —5— while the spring arm —19— which terminates just in front of the shoulder —20— may be sprung away from the adjacent portion of the strap to permit the loop —17— to be detached from or reconnected with the axle when desired.

In operation when the vehicle is being wheeled along comparatively even pavements with the excess of load at the rear of the axle —3—the leg —5— is rocked to the position shown by the full lines in Figs. —1— and 2 with the shoe —14— in proximity to the surface of the pavement in which position it is held against forward and rearward movement by the rear side of the loop —17— and catch —12—.

When passing down steep inclines and steps the catch —12— is lifted or elevated out of engagement with the outer leg —5— by the operator and the lower end of the leg is then rocked rearwardly and upwardly in which position it may be held by the operator by means of the handle bar —11— forming the upper end of the leg and when the vehicle is again brought to rest or upon level pavement the leg may be restored to its operative position as described.

What I claim is:

A push cart comprising a body, axle and wheels in combination with a bracket projecting rearwardly from the rear end of the body, a leg pivoted to said bracket and extending upwardly and downwardly therefrom, a catch on the rear end of the body for engaging the upper portion of the leg above the pivot and holding said leg in an upright position, and a strap pivotally connected to the lower end of the leg and having sliding interlocking connection with the axle.

In witness whereof I have hereunto set my hand this twenty-fourth day of April 1907.

JOSEPH T. KOEN.

Witnesses:
JOHN E. LANG,
WM. F. SANTRY.